Figure 1:
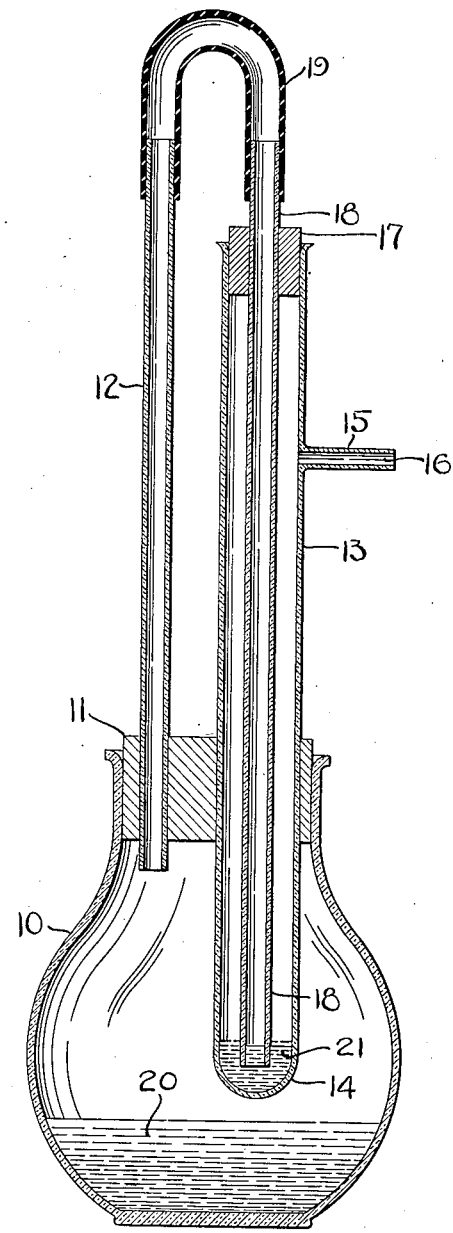

W. M. DEHN.
PROCESS OF AND APPARATUS FOR ESTIMATING ALCOHOL IN BEVERAGES AND THE LIKE.
APPLICATION FILED OCT. 16, 1919.

1,333,905. Patented Mar. 16, 1920.

UNITED STATES PATENT OFFICE.

WILLIAM M. DEHN, OF SEATTLE, WASHINGTON.

PROCESS OF AND APPARATUS FOR ESTIMATING ALCOHOL IN BEVERAGES AND THE LIKE.

1,333,905.  Specification of Letters Patent.  Patented Mar. 16, 1920.

Application filed October 16, 1919. Serial No. 331,032.

*To all whom it may concern:*

Be it known that I, WILLIAM M. DEHN, a citizen of the United States, and a resident of Seattle, county of King, and State of Washington, have invented certain new and useful Improvements in Processes of and Apparatus for Estimating Alcohol in Beverages and the like, of which the following is a specification.

One object of my invention is to provide a simple process whereby the alcohol content of beverages and other liquids can be estimated quickly by persons possessing limited technical knowledge and skill.

Another object of my invention is to provide an apparatus for carrying out the process, which can easily be carried on the person, and which is inexpensive and so simple as to be usable practically anywhere and at places other than laboratories.

A preferred construction of apparatus in accordance with my invention is shown in the accompanying drawing, in which the single figure is a vertical, central view of one form of apparatus.

The flask 10, constructed of resistant glass or other material, is fitted with an air tight stopper 11, perforated for the insertion of tube 12 and the larger or distilling tube 13. The tube 13 is sealed and rounded at the bottom, as shown at 14, providing an interior receptacle of relatively small capacity, as compared with flask 10. Said tube 13 is provided above stopper 11 with the sealed on side tube 15 having the mouth or outlet 16 open to the atmosphere. Tube 13 extends upwardly above stopper 11 to supply air cooling surface, and receives the air tight stopper 17 at its upper end. Through this stopper 17 is inserted the tube 18, reaching nearly to the bottom of the receptacle 14 formed at the lower end of tube 13, and connected, as by the flexible tubing 19, to the tube 12. The apparatus is air tight when connected up as described, except at the opening 16 of the exit tube 15.

A sample of the beverage or other liquid to be tested is placed in the flask 10 and a small quantity thereof is placed in the receptacle 14 at the bottom of tube 13 sealing the end of tube 18. All parts are then adjusted as shown in the drawing, so that the apparatus is air tight, except at the exit 16. The flask is then heated from any convenient source of heat, at such a rate that gentle boiling results. Vapors of alcohol and water, rising from the beverage 20 in flask 10 are condensed more or less in the reflux tube 12, by atmospheric cooling. The alcohol, being lower boiling than water, tends to pass on in the apparatus, while the water tends to condense and run back into flask 10. The vapors of alcohol are partly condensed by air cooling and run to the bottom of tubes 18 and 13. Some of the vapors, reaching the bottom of tube 13 are condensed there by the cooler small volume of beverage 21 in receptacle 14. The initial effect of boiling, therefore, is to increase the alcohol concentration in the receptacle 14 of tube 13.

As the height of liquid in receptacle 14 increases, more or less back pressure is created, exerting an elevating influence on the boiling point of the liquid 20 remaining in the flask 10. Also, the concentration of water in the beverage of flask 10 is increased by distillation of alcohol therefrom, and in this way the boiling point of the beverage remaining in flask 10 is further increased. In a short time the vapors in flask 10 become sufficiently hot to cause boiling of the liquid in the inner receptacle 14, which is substantially immersed in or surrounded by such heated vapors.

The distillation in the inner receptacle is influenced by three favoring conditions: mechanical agitation is imparted to the liquid 21 by uncondensed vapors from flask 10; more or less super-heating results from the difference in temperatures between the interior of flask 10 and the interior of receptacle 14; and water vapors rising to the top of tube 13 are more readily condensed by the air cooling encountered than is the case with the vapors of alcohol.

The combined result of the various factors involved in the entire apparatus is the evolution of alcohol-water vapors from the outlet 16, of such concentration of alcohol that continued burning is possible.

In carrying out the process by means of the apparatus described, a measured volume of beverage is preferably introduced as described, and is so heated that the vapors of alcohol emerge from the exit tube 15 at a substantially regular rate. The first combustible vapors are lighted and the heating of the apparatus and burning of the escaping vapors is continued until the flame goes out by reason of the alcohol content of the escaping vapors being too low to support further burning.

The time of burning is observed with proper regulation of the various factors involved, including volume of beverage taken and the heat applied. The time of burning can be made to bear a substantially constant ratio to the alcohol content of the liquid taken for test. For example, the time of burning in minutes can be made approximately equal to the percentage of alcohol contained in the beverage.

The apparatus described is sensitive to concentrations of alcohol less than 1%, and when regulated so that the burning time in minutes is substantially equal to the percentage of alcohol present, burning for one minute or more affords sufficient evidence that the beverage contains one per cent. or more of alcohol, and burning for longer periods demonstrates the presence of correspondingly greater percentages of alcohol.

It will be seen there is obtained in the simple, self-contained apparatus described, a preliminary distillation and fractionation of the alcoholic beverage, resulting in relative concentration of the alcoholic content, and such concentrated material is heated from the vapors of the main vessel, and a second distillation and partial fractionation obtained, whereby vapors sufficiently rich in alcohol to support burning for a limited period may be obtained, even though the alcoholic percentage of the beverage is low, and the time of burning may be made to give a substantially close indication of the alcoholic content.

I claim:

1. In apparatus for the estimation by distillation of alcohol in beverages, the combination of a flask, an air cooled vapor tube extending from said flask, a distilling tube in said flask and into which said vapor tube extends, the upper part of said distilling tube extending beyond the flask whereby it is air cooled, and an outlet in said distilling tube for exit of alcohol vapors to the atmosphere.

2. In apparatus for the estimation by distillation of alcohol in beverages, the combination of a flask, an air cooled delivery tube therefor, an inner distilling tube comprising air cooled surfaces, said delivery tube being adapted to deliver into said distilling tube, and an outlet to the atmosphere from said distilling tube, whereby alcohol vapors are delivered to the atmosphere and can be burned substantially steadily during a measured time.

3. In apparatus for the estimation by distillation of alcohol in beverages, the combination of a flask, an air cooled delivery tube, an inner distilling tube supplied with air cooling surfaces, the delivery tube extending to substantially the bottom of the distilling tube, and an outlet from the distilling tube to the atmosphere, whereby when the flask is subjected to a substantially constant source of heat, a beverage in said flask and distilling tube will boil regularly and deliver from said outlet vapors relatively high in alcohol content and adapted to be burned.

4. The combination of a distilling vessel, a receptacle therein for collecting distillate from the vessel, and an outlet for the receptacle outside the first vessel.

5. The combination of a distilling vessel, a receptacle therein above the liquid level, a condenser for the vessel discharging into the receptacle, and an outlet for the receptacle outside the vessel.

6. The combination of a distilling vessel, a receptacle therein above the liquid level, an air cooled tube extending from the vessel and extending into said receptacle below the fluid level therein, an air cooled tube extending from the receptacle outside the vessel, and an outlet for said tube.

7. The combination of a flask, a stopper therefor having two holes therein, a distilling tube in one of said holes closed at its lower end and having a stopper with a hole therein at its upper end, a reflux tube in the other hole in the flask stopper, a tube in the hole in the distilling tube stopper and extending to near the bottom of the distilling tube, a piece of flexible tubing for connecting the upper end thereof to the said reflux tube, and a side outlet to the atmosphere for the distilling tube.

8. The process of estimating alcohol content of beverages and the like, which comprises the steps of increasing the concentration of the alcoholic content thereof, and burning the vapors of such concentrated material.

9. The process of estimating the alcohol in liquid beverages and the like, which consists in distilling the liquid, redistilling the distillate using the vapors of the first distillation to provide heat for the redistillation, and burning the vapors obtained until combustion ceases.

10. The process of estimating alcoholic content of liquids, which comprises the steps of concentrating the alcohol by distillation and fractionation, immersing the concentrated distillate in the vapors of the first distillation whereby the distillate is heated and vapors are obtained therefrom, burning said vapors until combustion ceases and observing the time of combustion, whereby the alcoholic content is estimated.

In testimony that I claim the foregoing, I hereto set my hand, this 10th day of October, 1919.

WILLIAM M. DEHN,